(12) United States Patent
Hsieh

(10) Patent No.: US 6,476,526 B1
(45) Date of Patent: Nov. 5, 2002

(54) DIRECT CURRENT BRUSHLESS MOTOR FOR A FAN

(76) Inventor: Hsin-Mao Hsieh, No. 6, East Section, Chiao Nan Li, Industrial 6th Rd., Pingtung City, Pingtung Hsien (TW)

( * ) Notice: Subject to any disclaimer, the term of this patent is extended or adjusted under 35 U.S.C. 154(b) by 0 days.

(21) Appl. No.: 09/650,828

(22) Filed: Aug. 30, 2000

(51) Int. Cl.[7] ............................................. H03K 11/00
(52) U.S. Cl. ................................. 310/68 B; 310/68 R
(58) Field of Search .......................... 310/68 B, 156, 310/67 R, DIG. 3, DIG. 6, 68 R; 318/254

(56) References Cited

U.S. PATENT DOCUMENTS

| | | | | |
|---|---|---|---|---|
| 3,805,134 A | * | 4/1974 | Osamu et al. | 318/254 |
| 4,357,563 A | * | 11/1982 | Ohno | 318/254 |
| 4,704,567 A | * | 11/1987 | Suzuki et al. | 318/254 |
| 5,821,744 A | * | 10/1998 | Shinjo et al. | 324/207.2 |
| 6,097,129 A | * | 8/2000 | Furtwaengerl et al. | 310/256 |
| 6,109,892 A | * | 8/2000 | Horng | 417/423.15 |

* cited by examiner

*Primary Examiner*—Burton S. Mullins
(74) *Attorney, Agent, or Firm*—Alan Kamrath; Rider, Bennett, Egan & Arundel, LLP

(57) ABSTRACT

The invention discloses a direct current brushless motor for a fan. The motor has a housing, a stator, and a rotor. The stator has four pole sheets, a sensor installed between two neighboring pole sheets, and a circuit board electronically connected to the sensor. The rotor is installed on a shaft and has a metal cover under the housing and four permanent magnets. The sensor has a sensing window used to sense the magnetic strength of the permanent magnets. The sensor and the sensing window accordingly are offset a certain distance from a point directly above where two neighboring permanent magnets meet to obtain a better activation effect.

10 Claims, 5 Drawing Sheets

DIRECT CURRENT BRUSHLESS MOTOR FOR A FAN

BACKGROUND OF THE INVENTION

1. Field of the Invention

The invention relates to a direct current brushless motor for a fan, especially to a motor in which the position of a sensor is altered a certain distance to obtain a better activation effect.

2. Description of Related Art

With reference to FIG. 5, a conventional direct current brushless motor for a fan has a housing (31), a stator assembly (30) and a rotor assembly. The stator assembly (30) is contained in and fixed with respect to the housing (31). The rotor assembly is contained in and able to rotate with respect to the housing (31). The rotor assembly includes a metal cover (312) under the housing (31), four magnetic sectors evenly arranged under and along the metal cover (312), and a shaft (311). Each magnetic. sector is made up of a permanent magnet (313). The stator assembly (30) consists of four stator poles (301) evenly arranged on a round seat, a sleeve (33), a circuit board (32), and a sensor (321) electrically connected to the circuit board (32) and fixed between two stators poles (301). The round seat covers the sleeve (33). The sleeve (33) is connected to the shaft (311) by a bearing (34). The sensor (321) is used to sense the magnetic strength of the permanent magnets (313) and send signals to the circuit to activate the motor and keep the motor running. Before the motor is activated, the sensor (321) always stops with a sensing window (322) stopping right above where two neighboring permanent magnets (313) meet.

However, this kind of motor has a drawback. The magnetic strength where two neighboring permanent magnets (313) meet is the weakest. Therefore, it is always difficult, or needs a large activation current, to activate the motor.

SUMMARY OF THE INVENTION

The main object of the invention is to provide a direct current brushless motor in which the sensing window of the sensor is altered a certain distance to obtain a better activation effect.

Other objects, advantages and novel features of the invention will become more apparent from the following detailed description when taken in conjunction with the accompanying drawings.

DETAILED DESCRIPTION OF THE PREFERRED EMBODIMENT

Figure 1:
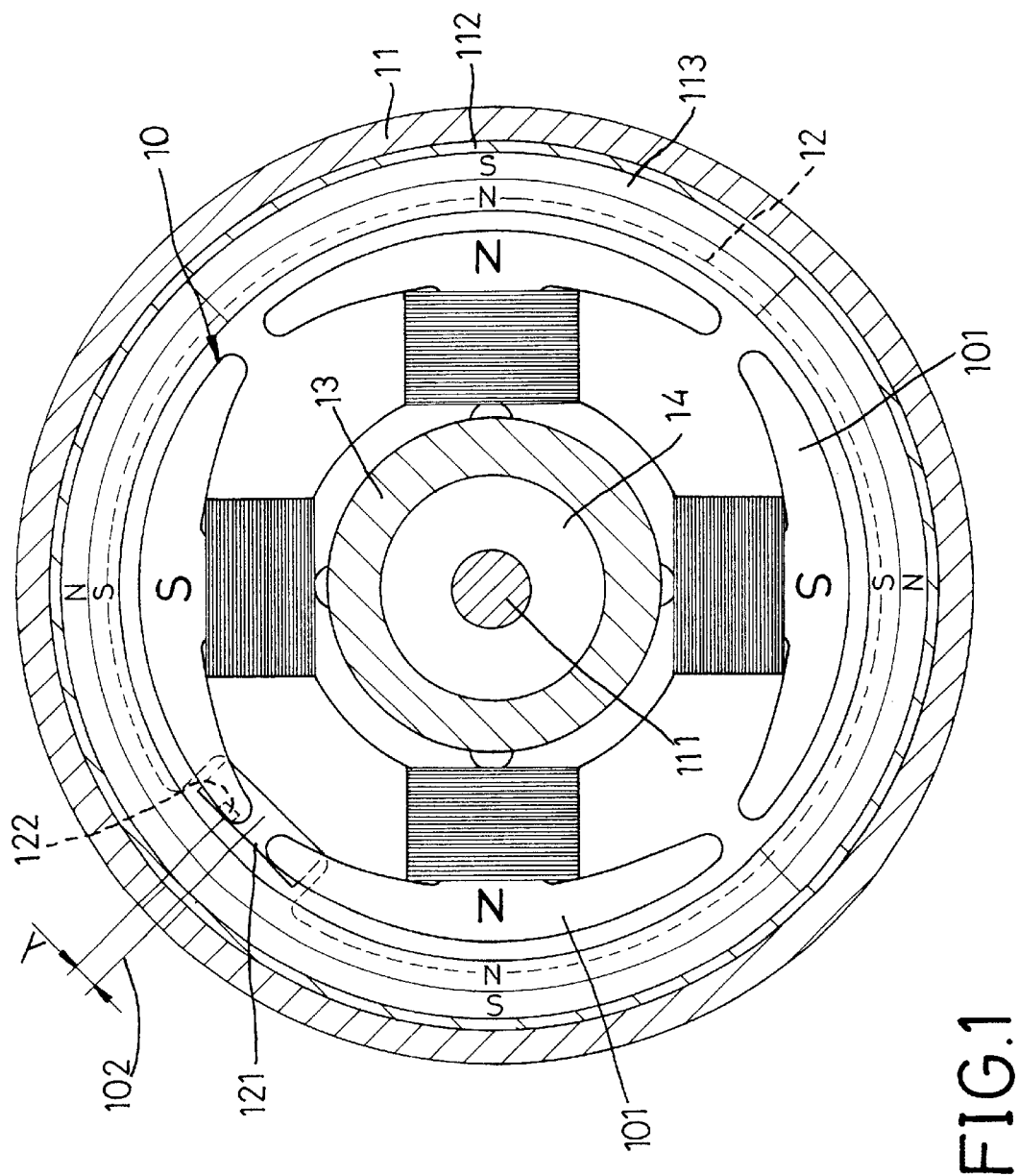
FIG. 1 is a cross sectional top view of the direct current brushless motor in accordance with the present invention.

With reference to FIG. 1, a direct current brushless motor for a fan has a housing (11), a stator assembly (10) and a rotor assembly. The stator assembly (10) is contained in and fixed with respect to the housing (11). The rotor assembly is contained in the housing (11) and able to rotate with respect to the housing (11). The rotor assembly includes a metal cover (112) under the housing (11), four magnetic sectors evenly arranged under and along the metal cover (112), and a shaft (111). Each magnetic sector is made up of a permanent magnet (113). The stator assembly (10) consists of four stator poles (101) evenly arranged on a round seat, a sleeve (13), a circuit board (12), and a sensor (121) electrically connected to the circuit board (12) and fixed between two stator poles (101). The round seat covers the sleeve (13). The sleeve (13) connects to the shaft (111) by a bearing (14). The sensor (121) is used to sense the magnetic strength of the permanent magnets (113) and then send signals to the circuit to activate the motor and keep the motor running.

The sensing window (122) of the sensor (121) is altered a distance ($\lambda$) from a position (102) midway in the gap between the stator poles (101) and directly above where two permanent magnets (113) meet when the direct current brushless motor stops as shown in FIG. 1.

Figure 2:
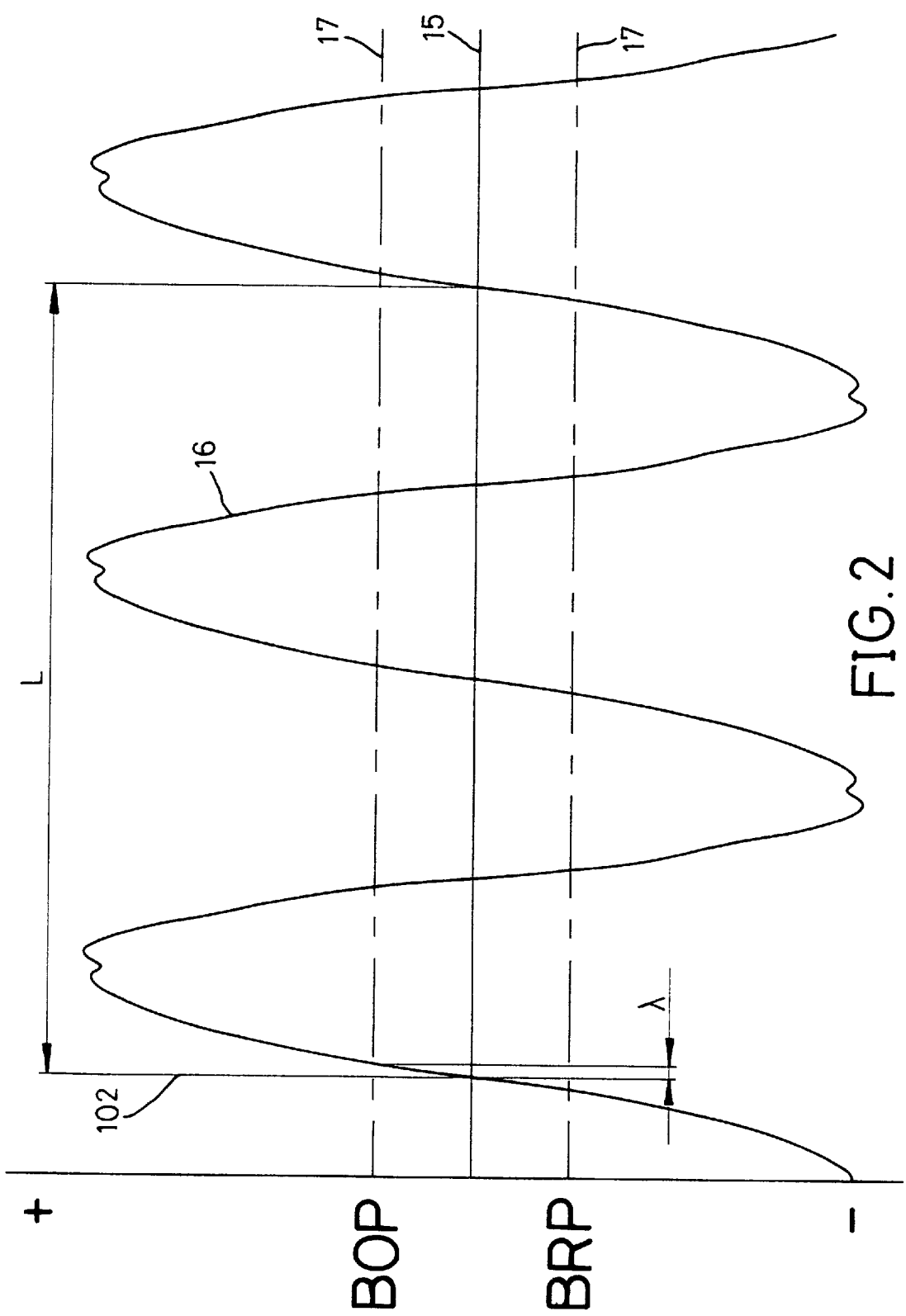
FIG. 2 is a graph of the magnetic strength along the permanent magnets in the direct C brushless motor in FIG. 1.

With reference to FIG. 2, the abscissa (15) is the extended trace the sensing window (122) passes, and the ordinate is the magnetic strength sensed. The curve (16) is the amplitude of the magnetic strength of the permanent magnets (113) sensed by the sensing window (122) during its trace. A complete cycle of the sensing window (122) is represented by the curve (16) as it passes through a distance L. The zero points on the curve (16) in the cycle L are at points above where two neighboring permanent magnets (113) meet. The dashed line (17) is the sensibility of the sensor (BOP: B: flux density; OP: operate point; and BRP: B: flux density; RP: release point). A distance traveled by the sensing window (122) from a preferred point where the curve (16) crosses the dashed line (17) to the nearest zero point is a preferred distance ($\lambda$'). When the distance ($\lambda$) shown in FIG. 1 is equal to the preferred distance ($\lambda$'), the sensor (121) and the circuit board (12) will need the lowest activation current to sense the magnetic strength, and the activation effect of the motor can be much improved.

Figure 3:
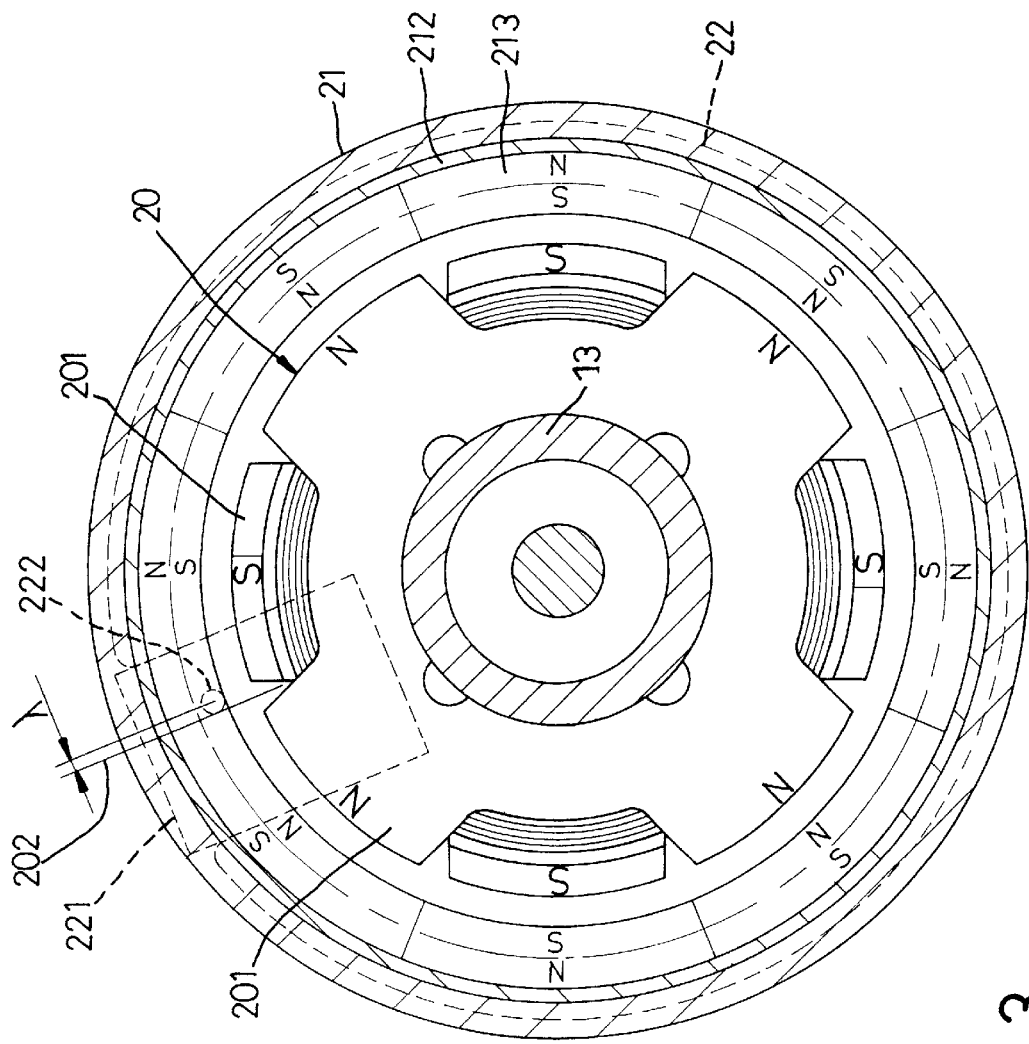
FIG. 3 is a cross sectional top view of another embodiment of the direct current brushless motor in accordance with the present invention.

With reference to FIG. 3, another embodiment of the motor in accordance with the present invention has a housing (21), a stator assembly (20) and a rotor assembly. The stator assembly (20) is contained in and fixed with respect to the housing (21). The rotor assembly is contained in and able to rotate with respect to the housing (21). The rotor assembly includes a metal cover (212) under the housing (21), eight magnetic sectors evenly arranged under and along the metal cover (212), and a shaft. Each magnetic sector is made up of a permanent magnet (213). The stator assembly (20) consists of eight stator poles (201) evenly arranged around sleeve (13), a circuit board (22), and a sensor (221) electrically connecting with the circuit board (22) and fixed between two stator poles (201).

The sensing window (222) of the sensor (221) is altered a distance ($\lambda$) from a position (202) midway in the gap. between adjacent stator poles (201) and directly above where two permanent magnets (213) meet when the direct current brushless motor stops as shown in FIG. 3.

Figure 4:
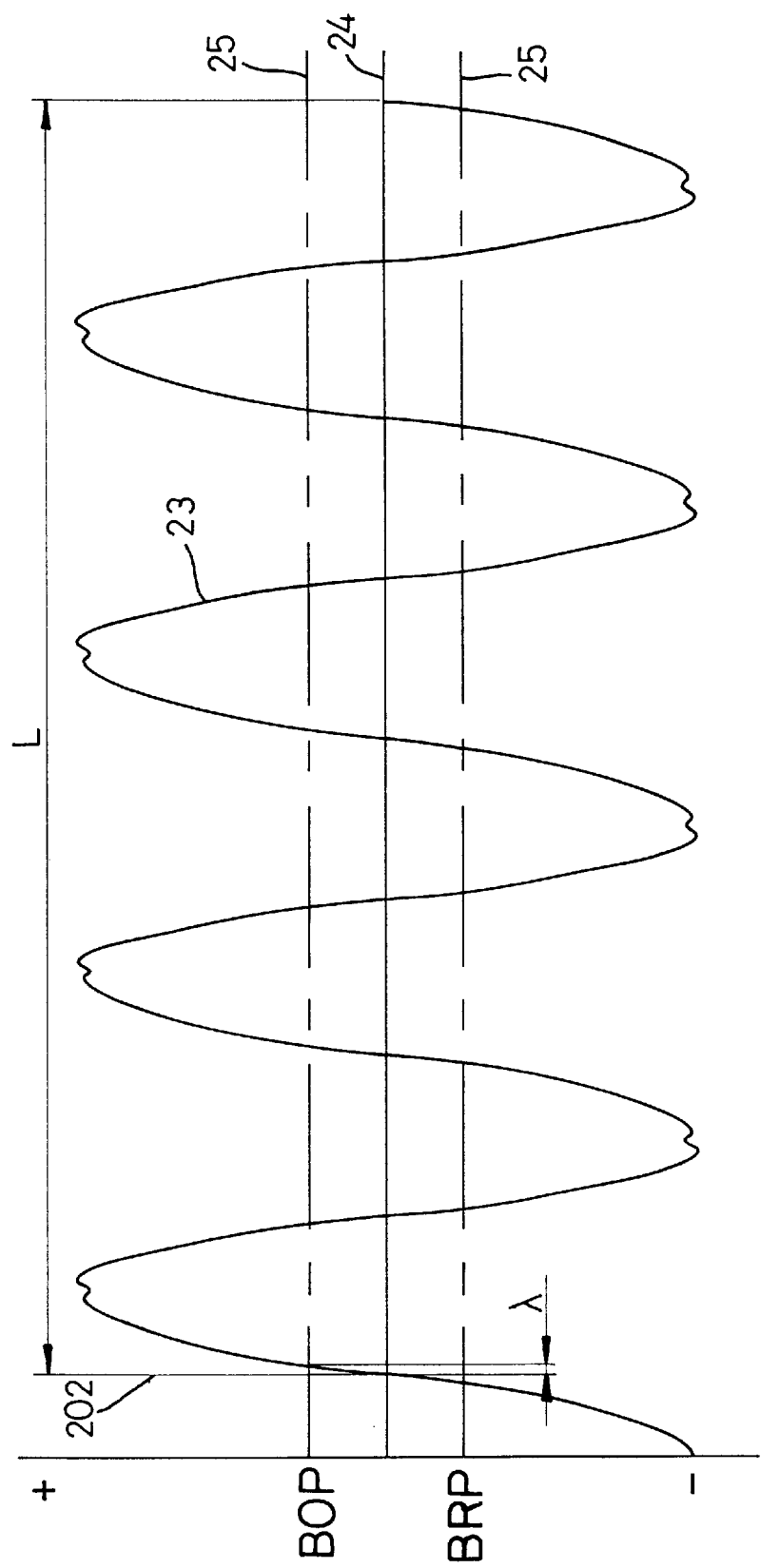
FIG. 4 is a graph of the magnetic strength along the permanent magnets in the direct current brushless motor in FIG. 4; and, FIG. 5 is a cross sectional view of a conventional direct current brushless motor.
Figure 5:
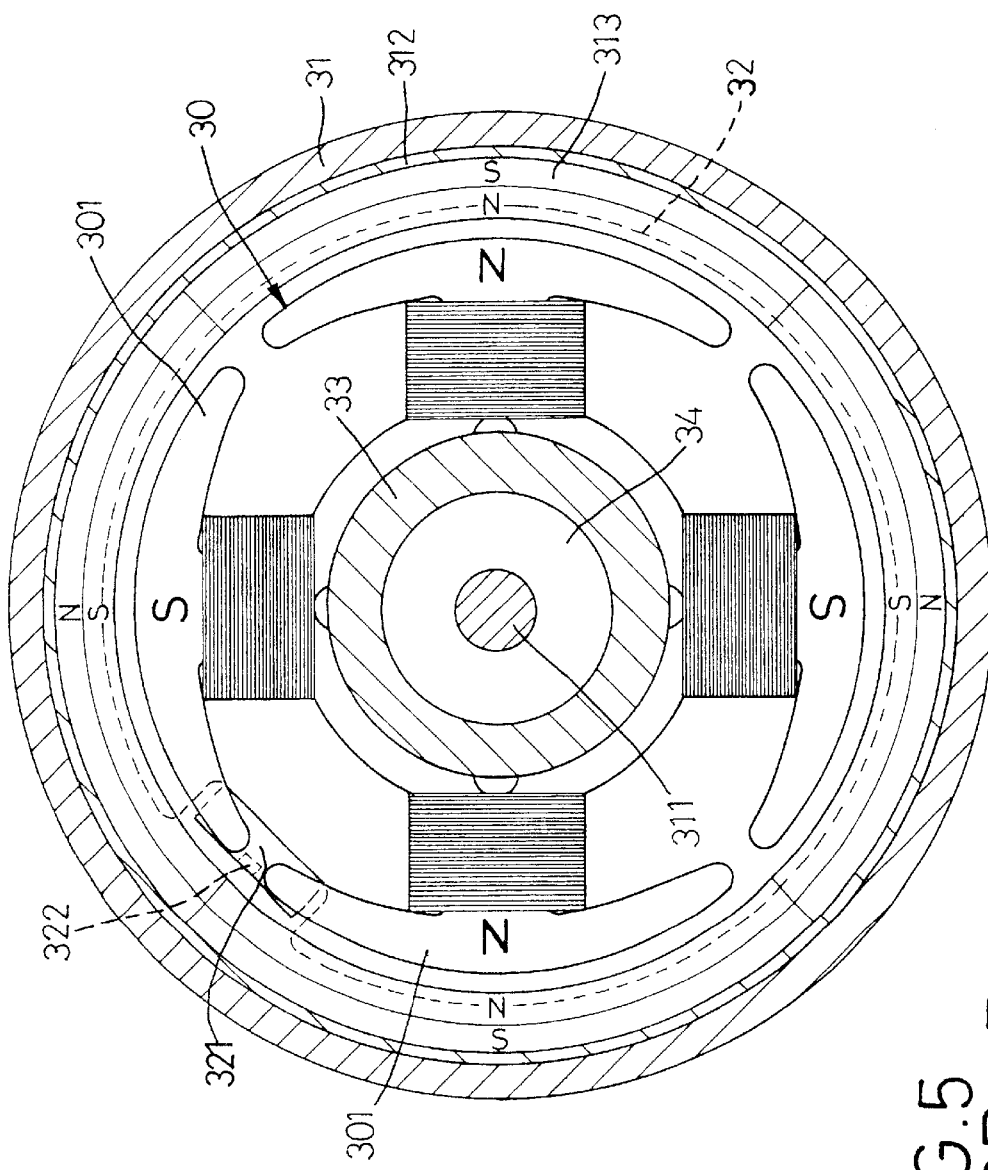

With reference to FIG. 4, the abscissa (24) is the extended trace the sensing window (222) passes, and the ordinate is magnetic strength. The curve (23) is the amplitude of the magnetic strength of the permanent magnets (213) sensed by the sensing window (222) during its trace. A complete cycle of the sensing window (222) is represented by the curve (23) as it passes through a distance L. The zero points of the curve (23) in the cycle L are at points above where two neighboring permanent magnets (213) meet. The dashed line (25) is the sensibility of the sensor (BOP and BRP). A distance traveled by the sensing window (222) from a preferred point where the curve (23) crosses the dashed line (25) to the nearest zero point is the preferred distance (λ'). When the distance (λ) shown in FIG. 3 is equal to the preferred distance (λ'), the sensor (221) and the circuit board (22) will need the lowest activation current to sense the magnetic strength, and the activation effect of the motor can be much improved.

Is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A direct current brushless motor for a fan, with the motor having a housing, a stator, and a rotor, with the stator having four stator poles, with a gap being defined between neighboring stator poles, a sensor installed between two neighboring stator poles and a circuit board electronically connected with the sensor, with the rotor being installed on a shaft and having a metal cover under the housing and having four permanent magnets, with the sensor having a sensing window used for sensing magnetic strength of the permanent magnets, with the improvements comprising:

the sensing window of the sensor altered an offset distance from a position midway in the gap defined between the two neighboring stator poles, poles, wherein the sensing window offset distance is from a point where the magnetic strength of the permanent magnets sensed by the sensor crosses a sensibility line of the sensor to a nearest zero point.

2. The direct current brushless motor as claimed in claim 1, wherein the position is directly above where two permanent magnets meet when the rotor is stopped.

3. The direct current brushless motor as claimed in claim 2, wherein as a curve on a graph with an abscissa showing a trace that the sensory window passes and an ordinate showing the magnetic strength sensed, the curve represents an amplitude of the magnetic strength sensed by the sensor during the trace, with the sensibility line showing sensibility of the sensor in the coordinate, and with the zero point located where the curve of the amplitude of the magnetic strength crosses the abscissa.

4. The direct current brushless motor as claimed in claim 1, wherein as a curve on a graph with an abscissa showing a trace that the sensory window passes and an ordinate showing the magnetic strength sensed, the curve represents an amplitude of the magnetic strength sensed by the sensor during the trace, with the sensibility line showing sensibility of the sensor in the coordinate, and with the zero point located where the curve of the amplitude of the magnetic strength crosses the abscissa.

5. The direct current brushless motor as claimed in claim 1, wherein the position is directly above where two permanent magnets meet when the rotor is stopped.

6. A direct current brushless motor for a fan, with the motor having a housing, a stator, and a rotor, with the stator having eight stator poles, with a gap being defined between neighboring stator poles, a sensor installed between two neighboring stator poles and a circuit board electronically connected to the sensor, with the rotor being installed on a shaft and having a metal cover under the housing and having eight permanent magnets, with the sensor having a sensing window used for sensing magnetic strength of the permanent magnets, wherein the improvements comprise:

the sensing window of the sensor offset an offset distance from a position midway in the gap defined between the two neighboring stator plates, plates, wherein the offset distance is from a point where the magnetic strength of the permanent magnets sensed by the sensor crosses a sensibility line of the sensor to a nearest zero point.

7. The direct current brushless motor as claimed in claim 6, wherein the position is directly above where two permanent magnets meet when the rotor is stopped.

8. The direct current brushless motor as claimed in claim 7, wherein as a curve on a graph with an abscissa showing a trace that the sensory window passes and an ordinate showing the magnetic strength sensed, the curve represents an amplitude of the magnetic strength sensed by the sensor during the trace, with the sensibility line showing sensibility of the sensor in the coordinate, and with the zero point located where the curve of the amplitude of the magnetic strength crosses the abscissa.

9. The direct current brushless motor as claimed in claim 6, wherein as a curve on a graph with an abscissa showing a trace that the sensory window passes and an ordinate showing the magnetic strength sensed, the curve represents an amplitude of the magnetic strength sensed by the sensor during the trace, with the sensibility line showing sensibility of the sensor in the coordinate, and with the zero point located where the curve of the amplitude of the magnetic strength crosses the abscissa.

10. The direct current brushless motor as claimed in claim 6, wherein the position is directly above where two permanent magnets meet when the rotor is stopped.

* * * * *